2,867,641

HYDROCARBONTINBORATES

Hugh E. Ramsden, Metuchen, N. J., assignor to Metal & Thermit Corporation, New York, N. Y., a corporation of New Jersey No Drawing. Application July 2, 1954
Serial No. 441,165

19 Claims. (Cl. 260—429.7)

The present invention relates to hydrocarbontin borates, particularly useful as stabilizing agents for resins and the like, to stabilized compositions containing the same and to processes for manufacturing the same.

In accordance with the present invention, the hydrocarbontin borates are reaction products of an hydrocarbontin oxide and boric acid or a partially esterified boric acid. They have the following formula:

$$(R_2Sn)_{3-n}(R')_{2n}(BO_3)_2$$

wherein R and R' are univalent organic radicals selected from the class consisting of alkyl, aryl and aralkyl radicals and where n has the value 0, 1 or 2. Thus R and R' may be ethyl, butyl, methyl, hexyl, phenyl, benzyl and phenylethyl. When $n=0$ the formula may be written $(R_2Sn)_3(BO_3)_2$.

The organotin borates may be prepared by reacting an organotin oxide with boric acid or a partial boric acid ester under conditions of elevated temperature, preferably between 80° and 140° C., and for a sufficient period of time to effect complete reaction therebetween. More specifically, the organotin borates are prepared by admixing boric acid with an organotin oxide, with or without an alcohol or phenol as a reactant, in the presence of an inert organic solvent, agitating and heating the reaction mixture until substantially all of the oxide has dissolved, maintaining the reaction mixture at an elevated temperature until substantially all of the water formed during the reaction has been removed, stripping the solvent from the reaction product, and recovering a substantially anhydrous organotin borate.

This is a condensation reaction whereby an organotin borate and water of condensation are formed and is illustrated by the following equations:

$$3(R_2SnO)+2(H_3BO_3) \rightarrow (R_2Sn)_3(BO_3)_2+3(H_2O)$$
$$R_2SnO+R'OH+H_3BO_3 \rightarrow (R_2Sn)(R')(BO_3)+2H_2O$$
$$R_2SnO+4R'OH+2H_3BO_3 \rightarrow (R_2Sn)(R')_4(BO_3)_2+5H_2O$$

The organotin borate salts are substantially colorless or white powders while the partially esterified products are clear liquids. Both types are particularly useful as stabilizers for chlorinated materials, particularly vinyl chloride polymers.

A feature of the invention resides in the utilization of substantially anhydrous reactants as well as in the maintenance of substantially anhydrous conditions, except for water formed by condensation, during the reaction. The presence of water adversely affects the yield of the final reaction product due to the reactivity of the organotin borate with water. However, minor quantities of water can be tolerated, as no other injurious effects of water have been observed.

Another feature of this invention resides in the use of reflux temperatures in order to remove the water of condensation as soon as it is formed during the reaction. The completing of the reaction may be observed by the cessation of water removal.

Still another feature of this invention resides in the utilization of an inert organic solvent as a reaction medium. Suitable solvents include toluene, benzene and xylene. The presence of a solvent facilitates the course of the reaction as well as the removal of the condensation water formed during said reaction. The solvent may be eliminated from the organotin borate salt at the completion of the reaction by any suitable means, including vacuum distillation at elevated temperatures, and simple evaporation on a steam bath.

A further feature of this invention is the use of agitation during the reaction in order to obtain a complete and homogeneous mixture of the reactants. Efficient agitation facilitates the dissolution of the organotin oxide and consequently assists in the complete utilization of substantially all of the reactants, eliminating undesirable side reactions as well as the presence of unreacted ingredients as contaminants in the final reaction product.

The organotin borate salts of the present invention can be obtained in almost theoretical yields of 95% or better. Consequently, the utilization of stoichiometric amounts of reactants is preferred, although the use of an excess of either is not prohibited.

The following example is further illustrative of the present invention, and it will be understood that the invention is not limited thereto:

Example I 124.4 gms. (0.5 mole, dry weight) dibutyl tin oxide was placed in a 3-necked, 1000 ml. flask equipped with a stainless steel stirrer, a reflux condenser with a water trap, a pot thermometer and a heating mantle and refluxed with toluene until dry. Then 20.5 gms. (0.333 mole) of boric acid was added to the slurry and heat and agitation were applied. After about 2 hours the reaction mixture was clear but very viscous. After an additional 2 hours of heating it became thin. It was poured into an evaporating dish and heated on a steam bath to remove the toluene. The product was a dry, white powder, dibutyl tin borate, $(C_4H_9)_2Sn_3(BO_3)_2$, containing 42.6% Sn (theory, 43.5% Sn).

Example II

An amount of wet dibutyltin oxide sufficient to yield 62.2 grams (0.25 mole) when dry was refluxed with toluene, water being separated from the condensate in a water trap. When the oxide was dry 30.9 grams (0.50 mole) of boric acid and 130 grams (1.0 mole) of 2 ethyl hexanol were added to the oxide-toluene slurry. Heat and stirring were applied until all of the oxide had dissolved and further until no more water of condensation appeared in the water trap. The toluene solvent was then distilled off leaving a clear, colorless liquid containing, by analysis, 14.3% Sn and 2.62% B. (Theory for $(C_4H_9)_2Sn(C_8H_{17})_4(BO_3)_2$ is 14.8% Sn and 2.7 B.)

These organotin borate salts function as stabilizers for compositions containing chlorinated materials, particularly chloride containing compositions, such as polyvinyl chloride, chlorinated paraffins, chlorinated rubber and polyvinylidene chloride. These compositions when containing .5 to 5% of these stabilizers and either with and without plasticizers, will provide plastic compositions of improved resistance to heat and light deterioration.

In order to test the behavior of the stabilizers of this invention in polyvinyl chloride plastics, the product of Example I was used to make up a plastic composition containing:

100 parts of polyvinyl chloride resin,
50 parts of di-2 ethyl hexyl phthalate
.88% $(C_4H_9)_2Sn_3(BO_3)_2$ The ingredients were mixed, milled at 320° F. on a differential speed 2-roll mill for 5 minutes after which the plastic composition was taken off the mill as a sheet about 40 mils thick. The sheet was cooled and subsequently cut into strips one inch wide by six inches long. These strips were laid flat on four cold glass plates which were then placed in a circulating air oven maintained at 320° F. The aged samples were removed at intervals and visually compared with similarly prepared unstabilized strips. The strips incorporating the stabilizer remain clear many hours after the stabilized strips had completely blackened.

Other uses of these organotin borate salts are as stabilizers for other chlorinated materials, as rubber accelerators, rubber antioxidants, lube oil additives and polymerization accelerators.

While the invention has been described with reference to various examples and embodiments, it will be apparent to those skilled in the art that various modifications may be made and equivalents substituted therefor, without departing from the principles and true nature of the present invention.

What is claimed by Letters Patent is:

1. As a composition of matter, an alkyltin borate having the general formula $$(R_2Sn)_{3-n}(R')_{2n}(BO_3)_2$$

wherein R and R' are alkyl radicals, and $n$ is a whole number, including zero, which is not greater than 2.

2. A method of preparing an alkyltin borate of claim 1 which comprises heating an alkyltin oxide of formula $R_2SnO$ with boric acid at reflux temperatures and recovering said alkyltin borate wherein R is an alkyl radical.

3. A method according to claim 2 wherein the reaction is carried out in an inert organic solvent.

4. A method of preparing an alkyltin borate which comprises heating an alkyltin oxide of formula $R_2SnO$ with boric acid partially esterified with an alkyl alcohol of formula R'OH at reflux temperatures and recovering said alkyltin borate wherein R and R' are alkyl radicals.

5. A method according to claim 4, wherein the reaction is carried out in an inert organic solvent.

6. A method of preparing an alkyltin borate which comprises heating an alkyltin oxide of formula $R_2SnO$ with boric acid and an alkyl alcohol of formula R'OH at reflux temperatures and recovering the alkyltin borate wherein R and R' are alkyl radicals.

7. A method according to claim 6, wherein the reaction is carried out in an inert organic solvent.

8. As a composition of matter, a dibutyltin borate of formula $$(C_4H_9)_2Sn_3(BO_3)_2$$

9. A method for the preparation of a dibutyltin borate of formula $$(C_4H_9)_2Sn_3(BO_3)_2$$

which comprises heating dibutyltin oxide and boric acid at reflux temperatures and recovering said dibutyltin borate.

10. A method according to claim 9 wherein the reaction is carried out in an inert organic solvent.

11. As a composition of matter a dibutyltin borate of formula $$(C_4H_9)_2Sn(C_8H_{17})_4(BO_3)_2$$

12. A method for the preparation of a dibutyltin borate of formula $$(C_4H_9)_2Sn(C_8H_{17})_4(BO_3)_2$$

which comprises heating dibutyltin oxide with boric acid and 2-ethylhexanol at reflux temperatures and recovering said dibutyltin borate.

13. A method according to claim 12, wherein the reaction is carried out in an inert organic solvent.

14. As a composition of matter a hydrocarbontin borate having the formula $$(R_2Sn)_{3-n}(R')_{2n}(BO_3)_2$$

wherein R and R' are univalent radicals selected from the class consisting of alkyl and monocyclic aromatic hydrocarbon radicals, and $n$ is a whole number, including zero, which is not greater than 2.

15. A method of preparing a hydrocarbontin borate of claim 14 which comprises heating a hydrocarbontin oxide with a compound selected from the class consisting of boric acid and a partial hydrocarbon boric acid ester above room temperature and for a sufficient period of time to effect complete reaction, and recovering said hydrocarbontin borate, the hydrocarbon groups of said reactants being selected from the class consisting of alkyl and monocyclic aromatic hydrocarbon radicals.

16. A method of preparing a hydrocarbontin borate of claim 14 which comprises heating an anhydrous hydrocarbontin oxide with a compound selected from the class consisting of boric acid and a partial hydrocarbon boric acid ester above room temperature and for a sufficient period of time to effect complete reaction, and recovering a substantially anhydrous hydrocarbontin borate salt, the hydrocarbon groups of said reactants being selected from the class consisting of alkyl and monocyclic aromatic hydrocarbon radicals.

17. A method according to claim 16 wherein the reaction takes place in an inert organic solvent.

18. A method of preparing a hydrocarbontin borate salt of claim 14 which comprises heating an anhydrous hydrocarbontin oxide with a compound selected from the class consisting of boric acid and a partial hydrocarbon boric acid ester at reflux temperatures and under anhydrous conditions for a sufficient period of time to effect complete reaction, and recovering a substantially anhydrous borate salt, the hydrocarbon groups of said reactants being selected from the class consisting of alkyl and monocyclic aromatic hydrocarbon radicals.

19. A method of preparing the compound set forth in claim 14 which comprises heating a compound having the formula $R_2SnO$ with boric acid and an alcohol having the formula R'OH and recovering said organotin borates, wherein R and R' are hydrocarbon radicals selected from the class consisting of alkyl and monocyclic aromatic hydrocarbon radicals.

References Cited in the file of this patent

UNITED STATES PATENTS

| | | |
|---|---|---|
| 2,455,612 | Schlattman | Dec. 7, 1948 |
| 2,630,442 | Church et al. | Mar. 3, 1953 |
| 2,636,891 | Gregory | Apr. 28, 1953 |
| 2,680,107 | Leistner et al. | June 1, 1954 |